(12) United States Patent
Kamerer

(10) Patent No.: US 7,182,399 B2
(45) Date of Patent: Feb. 27, 2007

(54) REMOVABLE AND ADJUSTABLE SUN SHADE FOR ROLL BAR EQUIPPED VEHICLES

(75) Inventor: Larry G. Kamerer, Floyds Knobs, IN (US)

(73) Assignee: Vicki C. Kamerer, Floyds Knobs, IN (US)

( * ) Notice: Subject to any disclaimer, the term of this patent is extended or adjusted under 35 U.S.C. 154(b) by 291 days.

(21) Appl. No.: 10/927,795

(22) Filed: Aug. 27, 2004

(65) Prior Publication Data
US 2005/0073169 A1    Apr. 7, 2005

Related U.S. Application Data

(60) Provisional application No. 60/498,077, filed on Aug. 27, 2003.

(51) Int. Cl.
*B60J 7/00* (2006.01)

(52) U.S. Cl. ............ 296/193.12; 296/102; 296/190.08; 296/210

(58) Field of Classification Search ........... 296/193.12, 296/97.9, 102, 190.03, 190.08, 107.01, 11, 296/107.03, 107.17, 210, 111; 280/756
See application file for complete search history.

(56) References Cited

U.S. PATENT DOCUMENTS

| 4,032,187 | A | * | 6/1977 | Atherton ..................... 296/102 |
| 4,159,835 | A | * | 7/1979 | Leja et al. .................. 296/102 |
| 5,842,732 | A | * | 12/1998 | Daggett et al. ............. 296/102 |
| 5,882,063 | A | * | 3/1999 | Job ............................ 296/102 |
| 6,126,227 | A | * | 10/2000 | Bitelli .................... 296/107.03 |
| 6,557,922 | B1 | * | 5/2003 | Hommel ................ 296/107.17 |
| 6,578,854 | B2 | * | 6/2003 | Wucherpfennig et al. ... 180/330 |
| 6,883,846 | B2 | * | 4/2005 | Cheek et al. .............. 296/1.02 |
| 2005/0168007 | A1 | * | 8/2005 | Westendorf et al. ........ 296/102 |
| 2005/0212278 | A1 | * | 9/2005 | Kurten et al. ............... 280/756 |

* cited by examiner

*Primary Examiner*—Jason Morrow

(57) ABSTRACT

A sun shade which can be removed or installed without tools and mounts to a universal mounting bracket on roll bars on tractors whether they lean forwards or backwards and employs a unique slot and notch system which provides a wide and safe range of adjustability.

3 Claims, 3 Drawing Sheets

REMOVABLE AND ADJUSTABLE SUN SHADE FOR ROLL BAR EQUIPPED VEHICLES

CROSS-REFERENCE TO RELATED APPLICATION

Figure 1:
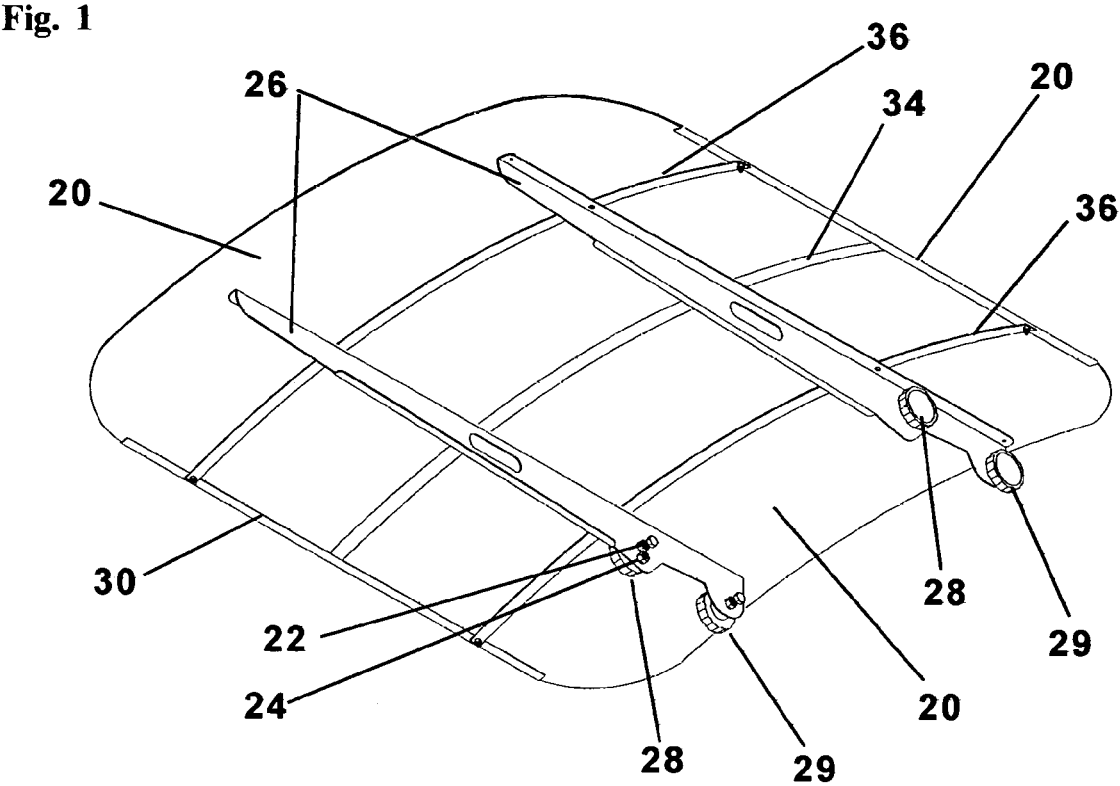

This application claims the benefit of Provisional patent application Ser. No. 60/498,077 filed Aug. 27, 2003.

BACKGROUND

1. Field of Invention

This invention relates to a device designed to protect outdoor power equipment operators from unnecessary exposure to sunlight.

2. Description of Prior Art

An investigation has revealed that while various other means and devices have been employed to protect humans from exposure to sunlight while operating vehicles such as tractors and mowers, none of these devices embody all of the features of removability, adjustability and storageablity in one device. A patent search did not reveal the existence of any prior art pertaining to the design or fabrication of a lightweight, removable, foldable and adjustable sun shade for outdoor power equipment or one that attaches to a roll bar. Nor did a search reveal any prior art for tractor sun shades or canopies.

BACKGROUND OF THE INVENTION

This invention was developed in response to the need for a low cost sun shade canopy for outdoor power equipment. The objectives were to create a low-cost, easily installed and removed sun shade that could adjust to fit as many different sizes and tilt angles of tractor roll bars as possible. Additionally, a well-designed sun shade should be adjustable for horizontal positioning and have the ability to quickly tilt down for passage under low obstructions and trailering-ideally without the use of tools. The ability to withstand repeated contact with tree limbs and brush was also an important objective. Our device has achieved all of those objectives. None of the available existing devices are easily removed nor are they readily adjustable. The existing designs are bulky, difficult to install, not easily removable, nonadjustable and far more costly to produce than our design.

Certain classes of outdoor power equipment, such as tractors and mowers where the operator sits on the equipment, are required by OHSA and the Consumer Safety and Protection Commission (CPSC) to have a roll bar or other apparatus that meets the requirements of the roll over protection system (ROPS) mandated by these federal agencies. Generally, manufacturers choose to install a square or rectangular section steel tube roll bar over the area where the operator sits. This roll bar must be strong enough to withstand the weight of the vehicle and attachments in the event that the vehicle turns over or upside down. Most of these roll bars are designed and attached so that they may be positioned at different angles to clear obstacles when needed or to be lowered for storage. When in the fully upright position on various models of tractors the ROPS may be leaning forwards, backwards or vertical. Most ROPS are between 11 degrees fore or aft of vertical. A set of stout pins with safety clips are used to secure most roll bars in their upright position. If the roll bar needs to be lowered, then the pins are removed.

DESCRIPTION

Our sun shade has been designed to attach to the existing structure of the roll-over protection system without drilling, modifying or in any way affecting the performance of the roll bar. Many roll bars are designed to fold near the middle of their height in order to allow passage underneath low obstructions or to facilitate storage. Our device is designed to allow easy folding or removal of the sun shade when either of these operations is necessary. If the roll bar is not vertical, then it is important that the sun shade be adjustable so that it can remain at or near horizontal when installed.

Our specially designed universal mounting mechanism allows a multitude of different elevations to be selected when positioning the canopy. The various operator selectable positions insure that the canopy can be set at a horizontal or near horizontal position above the operator's head. The horizontal positioning adjustability of the canopy allows the operator to select the elevation which is best for maximum visibility in all directions while maintaining safe clearance over the operator's head.

Additionally, a separate set of positioning features comprising repositionable bolts allows for a further range of adjustment such as encountered with ROPS that lean forwards toward the operator. The user may select the mounting locations that best suit the verticality of his particular ROPS and install the sunshade to a position that best suits his or her needs.

Our device is removable, installable, adjustable and storageable in place without the use of tools. It is also configured by the design of its mounting mechanism so that up to three of the four canopy tightening knobs can become loose and the sun shade will still not come off and injure the operator. The permanent mounting bracket is also designed to attach securely to roll bars of varying cross-sections by means of an adjustable bracket with slotted mounting bolt holes.

OBJECTS AND ADVANTAGES

Accordingly, besides the benefit of shading the operator from sunlight as described above in my patent, several additional objects and advantages of the present invention are:

(a) its lightweight construction makes installation and removal easy. Once the permanent mounting bracket is installed on the roll bar, installation or removal of the sun shade and its supporting framework is accomplished without tools.

(b) its adjustability for horizontal positioning improves visibility and headroom clearance for the operator. This adjustability is accomplished without tools.

(c) the ability to lower the sun shade without removing it is highly advantageous when preparing the vehicle for storage in a height limited garage. This feature is especially important when trailering the vehicle to prevent wind from catching or damaging the sun shade while towing at high speed as the sun shade may be secured in the folded down position using the integral tightening devices.

(d) the tough thermoplastic roof panels are formulated to withstand years in the sun. All metal parts are powder-coated steel and special steel edge channels help the sun shade withstand repeated encounters with limbs and brush. Operator protection from the physical intrusions of limbs and brush is also achieved as well as protection from exposure to harmful ultraviolet rays from the sun.

(e) it can be consumer assembled and installed. Our sun shade can be hand-carried by one person or shipped by common ground carriers such as the U.S. Post Office, unlike large one-piece fiberglass, metal or vacuum-molded sun shades which must be shipped by truck and which must usually be installed by a professional mechanic.

(f) the ability to remove our sun shade without tools is a feature not found on current sun-shade devices. The operator may easily and without tools remove the sun shade whenever desired such as when the operator simply would like to get some sun.

(g) our sun shade's permanent mounting bracket is designed so that once installed, no further use of tools are needed to adjust, install, tilt down, remove or store the sun shade.

(h) our special slot and notch design keeps the sun shade in place even if three of the four tightening knobs become loose. This is an extremely important safety feature for a sun shade that can be installed and removed without tools.

SUMMARY

Our device embodies an advancement in state-of-the-art of sun shades for outdoor power equipment. Currently there is no known sun shade available in the outdoor power equipment market which offers a universal mount with a full-range of adjustability, tool-less sun shade installation or removal, tool-less storage, transporting capability, rugged construction and low cost such as is embodied in our device. Additionally the ability of our universal mounting bracket to adapt to a range of tube sizes and tilt angles of various roll bars eliminates the need for creating many different specialized mounting brackets. Our device does all this at a lower cost than any one-piece sunshade and without compromising operator safety.

DRAWING FIGURES

Figure 2:
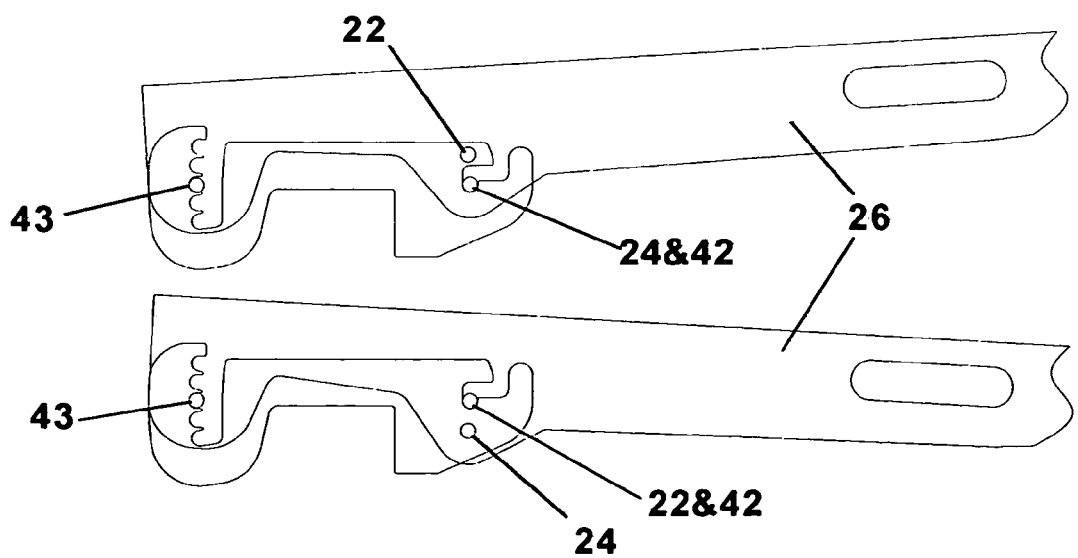
Figure 3:
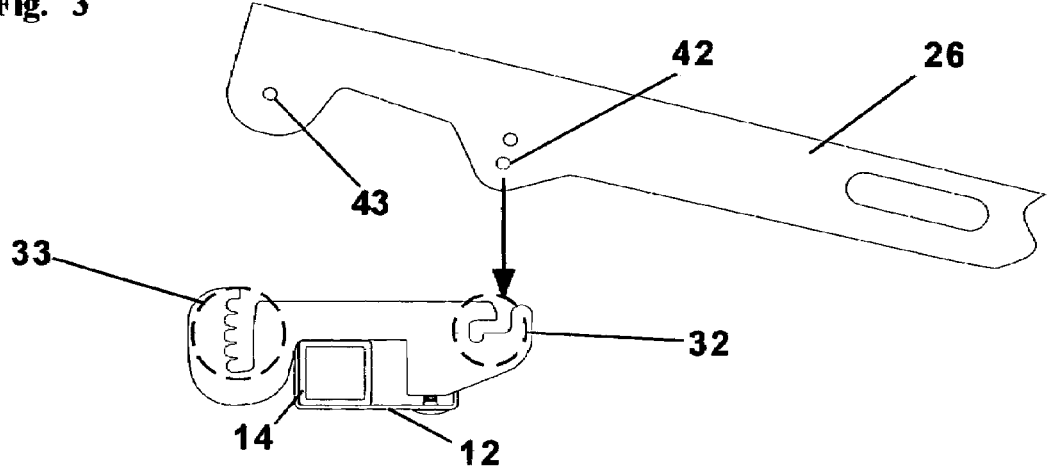
Figure 4:
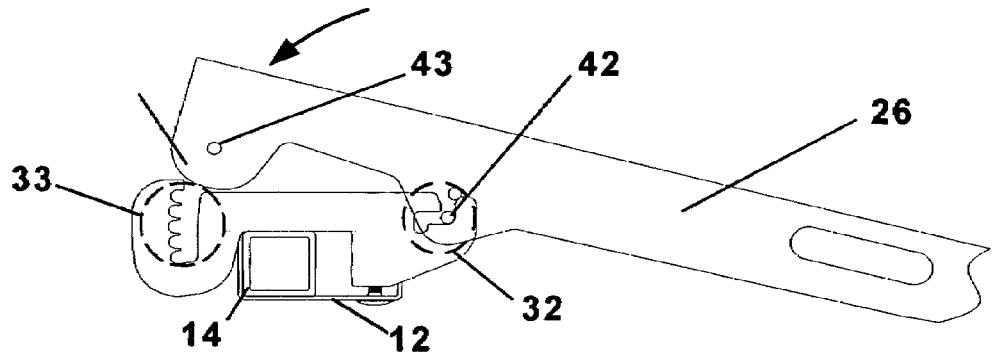
Figure 5:
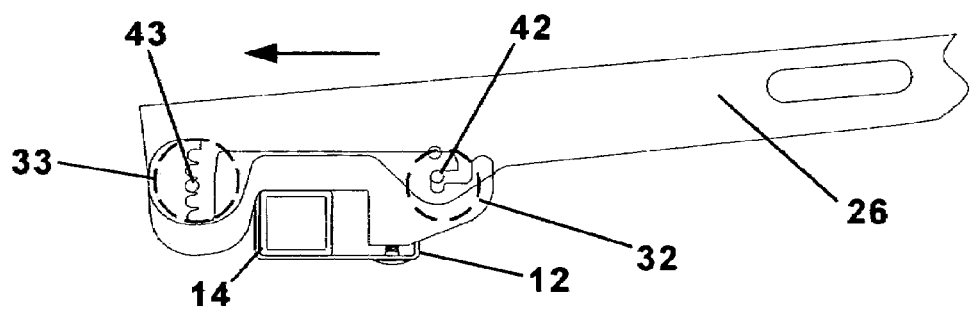
Figure 6:
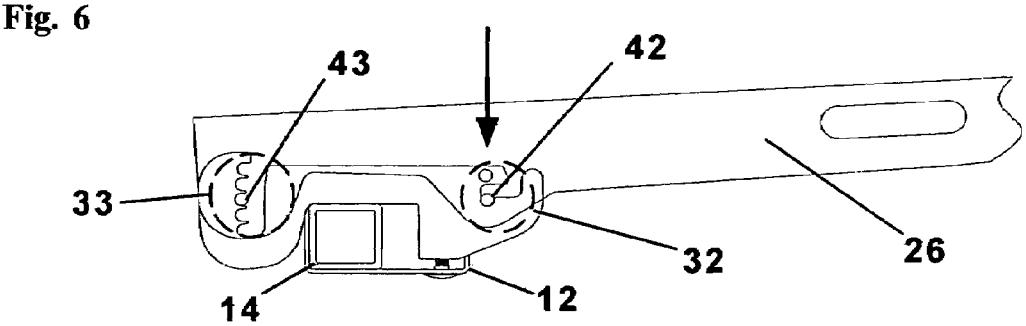
Figure 7:
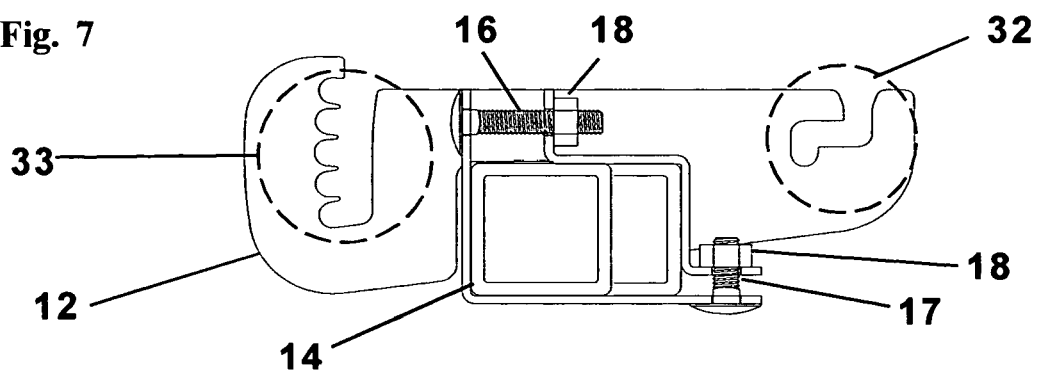
Figure 8:
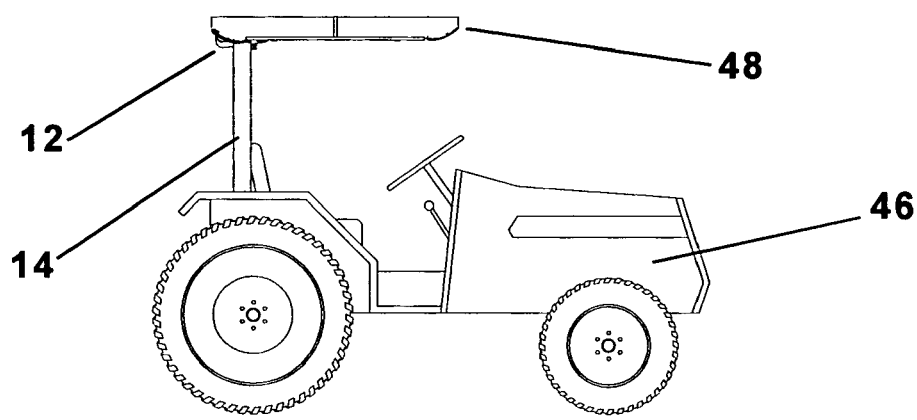
Figure 9:
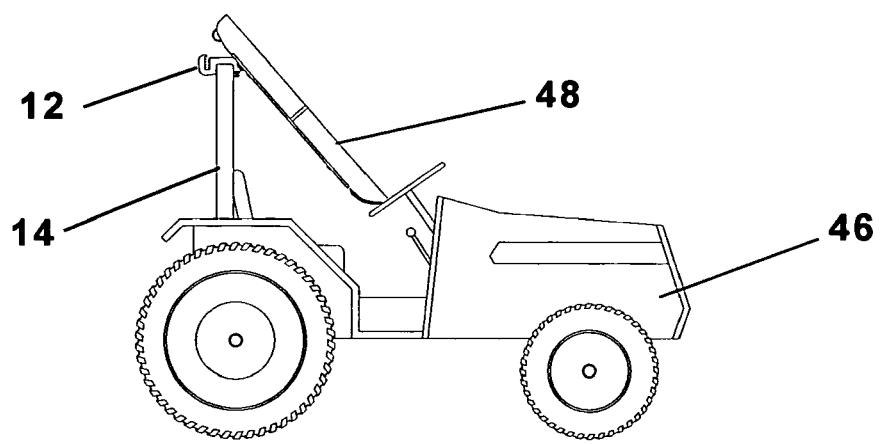
Figure 10:
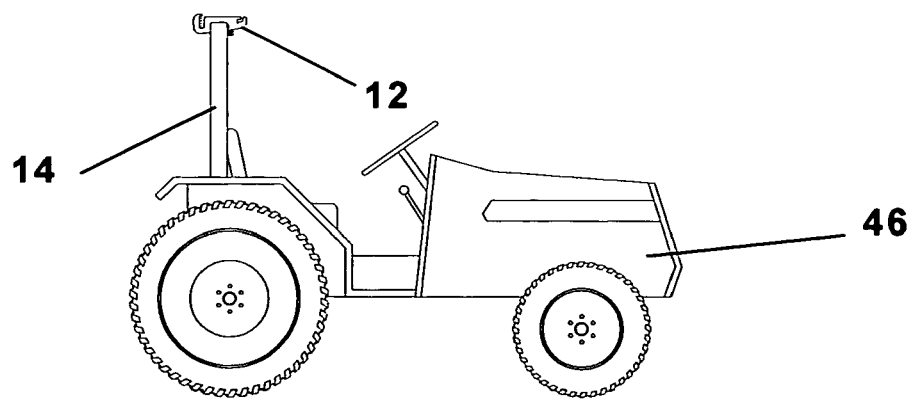

FIG. 1 Underside View Sun Shade Assembly
FIG. 2 View of Tilt Adjusting Nuts
FIG. 3 Installation Sequence One-Drop Into Place
FIG. 4 Installation Sequence Two-Rotate Into Position
FIG. 5 Installation Sequence Three-Select Horizontal Position Notch
FIG. 6 Installation Sequence Four-Slide & Secure
FIG. 7 Cross-section Showing Mounting Bracket Adjustability
FIG. 8 Tractor with Sun Shade in the Horizontal Position
FIG. 9 Tractor with Sun Shade in the Tilted-Down Position
FIG. 10 Tractor with Sun Shade Removed

REFERENCE NUMERALS IN DRAWINGS 12 permanent mounting bracket
14 tractor roll bar
16 horizontal mounting bracket bolt
17 vertical mounting bracket bolt
18 permanent mounting bracket nut
20 sun shade panel
22 upper tilt adjustment nut
24 lower tilt adjustment nut
26 canopy support spar
28 forward canopy tightening knob
29 rear canopy tightening knob
30 edge stiffening channel
32 forward locating and pivoting slot
33 rear positioning slot with notches
34 panel divider strip
36 canopy bow
42 threaded shaft of the forward canopy tightening knob
43 threaded shaft of the rear canopy tightening knob
46 tractor
48 sun shade panel assembly Description—FIGS. 1, 2, 3, 4, 5, 6, 7, 8, 9 & 10—Preferred Embodiments FIG. 1 FIG. 1 is a view of the entire sun shade looking up from the ground as one would see the sun shade mounted on a tractor roll bar. Each canopy support spar 26 has a forward canopy tightening knob 28 and a rear canopy tightening knob 29, which are threaded through each canopy support spar 26 in two places on each spar and which are designed to engage the forward locating and pivoting slot 32 and the rear positioning slot with notches 33 (see FIG. 3) which are integral to the permanent mounting bracket 12 (see FIG. 3) and locate the sun shade in one of five different positions where the forward canopy tightening knob 28 and the rear canopy tightening, knob 29 can be rotated to either loosen the sun shade for removal or lock it in a horizontal position or in a tilted down position. Also shown in this view are the upper tilt adjustment nut 22 and the lower tilt adjustment nut 24 which are utilized to extend the horizontal elevation range of the sun shade when mounted to roll bars which lean forwards or backwards from vertical.

FIG. 2 FIG. 2 shows the notch 33 and slot 32 (see FIG. 3) portion of the permanent mounting bracket 12 and how they orient to the spar 26 relative to the upper tilt adjustment nut 22 and the lower tilt adjustment nut 24. In the upper half or the figure the threaded shaft of the forward canopy tightening knob (not shown for clarity) would be threaded into the lower tilt adjusting nut 24 which provides extended elevation adjustment for rear leaning roll bars. In the lower half of the figure the threaded shaft of the forward canopy tightening knob 28 (not shown for clarity) is threaded into the upper tilt adjusting nut 22 providing extended elevation adjustment for rear leaning roll bars. The rear positioning slot with notches 33 (see FIG. 3) is shown in both parts of this figure with the threaded shaft of the rear canopy tightening knob 29 located in the middle notch to demonstrate the angular difference in the spar 26 elevation that occurs when either of the tilt adjusting nuts is selected.

NOTE: FIGS. 3, 4, 5 & 6 comprise a series of views which illustrate the procedure for mounting, tilting down and removing the sun shade panel assembly 48 (not shown in these views for clarity) relative to the permanent mounting bracket 12 and the tractor roll bar 14. Only the canopy support spar 26, the permanent mounting bracket 12, and the threaded shaft of the forward canopy tightening knob 42, the threaded shaft of the rear canopy tightening knob 43, the forward locating and pivoting slot 32, and the rear positioning slot with notches 33 are shown in order to more easily explain the operation of the sun shade.

NOTE: For simplicity of explanation the mounting sequence shown is appropriate for a rear leaning roll bar. With a rear leaning roll bar the forward canopy tightening knob 28 is threaded into the lower tilt adjustment nut 24. For forward leaning roll bars the forward canopy tightening knob 28 is threaded into the upper tilt adjustment nut 22. Once the operator selects the tilt adjusting nut appropriate for his tractor the remainder of the mounting sequence is the same. The range of vertical tilt adjustment attainable with the two tilt adjustment nuts is more than enough to accommodate roll bars on current and past production roll bar equipped tractors.

Operation—FIGS. 3, 4, 5 & 6

FIG. 3 In this figure, the canopy support spar 26 and the threaded shaft of the forward canopy tightening knob 42 are positioned directly above the permanent mounting bracket 12 and forward locating and pivoting slot 32 as the sun shade panel assembly 48 would be just prior to installation. The operator would lower the threaded shaft of the forward canopy tightening knob 42 into the forward locating and pivoting slot 32, where it would come to rest on the forward end of the horizontal bottom of the forward locating and pivoting slot 32, as shown in FIG. 4 below.

FIG. 4 In this view, the canopy support spar 26 with the threaded shaft of the forward canopy tightening knob 42 is at rest in the forward end of the horizontal bottom section of the forward locating and pivoting slot 32 in preparation for the next step in installation which is to rotate the forward end of the canopy support spar 26 upwards. This will cause the threaded shaft of the rear canopy tightening knob 43 to drop into the rear positioning slot with notches 33.

FIG. 5 FIG. 5 represents the positioning of the threaded shaft of the forward canopy tightening knob 42 in the forward locating and pivoting slot 32 and the threaded shaft of the rear canopy tightening knob 43 relative to the rear positioning slot with notches 33. In this position the operator can select the elevation of the canopy relative to the ground by sliding the threaded shaft of the rear canopy tightening knob 43 into one of the five available rear positioning slot with notches 33 to the horizontal elevation desired.

FIG. 6 In FIG. 6, the operator completes the installation by allowing the threaded shaft of the forward canopy tightening knob 42 to drop into the pocket of the forward locating and pivoting slot 32. The sun shade is now positioned and the operator simply tightens both forward canopy tightening knobs 28 and both rear canopy tightening knobs 29 to secure the sun shade in place. Removal of the sun shade is accomplished by reversing the above steps.

FIG. 7 FIG. 7 shows a cross-section of the permanent mounting bracket 12 in relation to the tractor roll bar 14. A 2" square roll bar is shown in cross-section and the dashed lines show the profile of a 2"×3" roll bar. The permanent mounting bracket 12 is shown adjusted to fit a 2"×3" roll bar to illustrate the range of adjustment designed into the permanent mounting bracket 12. This is accomplished by slots manufactured into the permanent mounting bracket 12 which allow the horizontal mounting bracket bolt 16 and vertical mounting bracket bolt 17 to move as needed to fit different sizes of roll bars.

FIG. 8 In FIG. 8, a tractor 46 is shown with a sun shade panel assembly 48 installed to the permanent mounting bracket 12 which is attached to the tractor roll bar 14 and ready for operational use.

FIG. 9 FIG. 9 shows the same tractor 46 with the sun shade panel assembly 48 tilted down for trailering or towing. The permanent mounting bracket 12 is attached to the tractor roll bar 14. To obtain the folded-down position, the operator loosens the two rear canopy tightening knobs 29 and the two forward canopy tightening knobs 28 so that the sun shade may be lifted slightly and slid forwards in the front which lifts the threaded shafts of the forward canopy tightening knobs 42 out of the pocket in the forward locating and pivoting slot 32 which allows the threaded shaft of the rear canopy tightening knob 43 to disengage from the rear positioning slot with notches 33. The forward end of the sun shade will then fall down as shown. The operator then tightens the two forward canopy tightening knobs 28 and the tractor is ready for towing or trailering.

FIG. 10 This view shows the sun shade completely removed from the tractor 46. The permanent mounting bracket 12 remains on the tractor roll bar 14 ready for the sun shade to be reinstalled.

CONCLUSION, RAMIFICATIONS, AND SCOPE

Accordingly, the reader will see that the usefulness of this device is obvious to anyone who operates power equipment outdoors in the sun or the rain. The ability to quickly and easily install a sun shade without the use of tools, adjust the sun shade for horizontal position and do so at a far lower cost than anything else available on the market is an important advancement in the art. The ability to rotate the sun shade downward for trailering or added clearance for storage is entirely new to this category of products. The slot and notch mounting design provide a generous margin of safety. The universal permanent mounting bracket allows our sun shade to fit most roll bars eliminating the need for building lots of specialized mounting brackets.

I claim:

1. A sun shade device having sunlight blocking panels for outdoor power equipment consisting of a permanent mounting bracket or brackets mounted to a vehicle's roll bar and a detachable and adjustable support frame comprising:
   (a) a mounting bracket attached to a vehicle roll bar that is designed to slip over a square or rectangular section of said bar and having a plurality of sets of bolt holes to accept roll bars of different widths, and;
   (b) said mounting bracket having a plurality of rear positioning notches at one end and a forward locating and pivoting slot at an opposed end, said notches adapted to receive a rear tightening device on said sunlight blocking panels and said slot adapted to receive a forward tightening device on said sunlight blocking panels.

2. A sun shade having sunlight blocking panels for outdoor power equipment which has a universal bracket adjustable for horizontal positioning of the sun shade and varying tilt angles and sizes of roll bars consisting of:
   (a) a mounting bracket attached to a vehicle roll bar, said mounting bracket having a plurality of rear positioning notches at one end and a forward locating and pivoting slot at an opposed end, said notches adapted to receive a rear tightening device on said sunlight blocking panels and said slot adapted to receive a forward tightening device of said sunlight blocking panels, which allows the user to level the sun shade by selecting the appropriate notches for receiving appropriate tightening devices therein, and;
   (b) a set of tightening devices that secure the sun shade in the slot and one of said notches selected by the installer when the sun shade is installed and;
   (c) a set of multiple locating bolts, nuts or pins which can be selected as needed to enable the sun shade to accommodate roll bars that are leaning forwards, backwards or anywhere in between further extending the adjusting range of the sun shade.

3. A sun shade having sunlight blocking panels for outdoor power equipment which installs, tilts down or removes without the use of tools consisting of:
   a configuration in a slot and notch mechanism of a mounting bracket attached to vehicle roll bar which allows for pivoting of a support frame and sun shade panel downwards and securing it in a tilted down position utilizing a set of tightening devices, said mounting bracket having a plurality of rear positioning notches at one end and a forward locating and pivoting slot at an opposed end, said notches adapted to receive a rear tightening device on said sunlight blocking panels and said slot adapted to receive a forward tightening device of said sunlight blocking panels.

* * * * *